Figure 1:
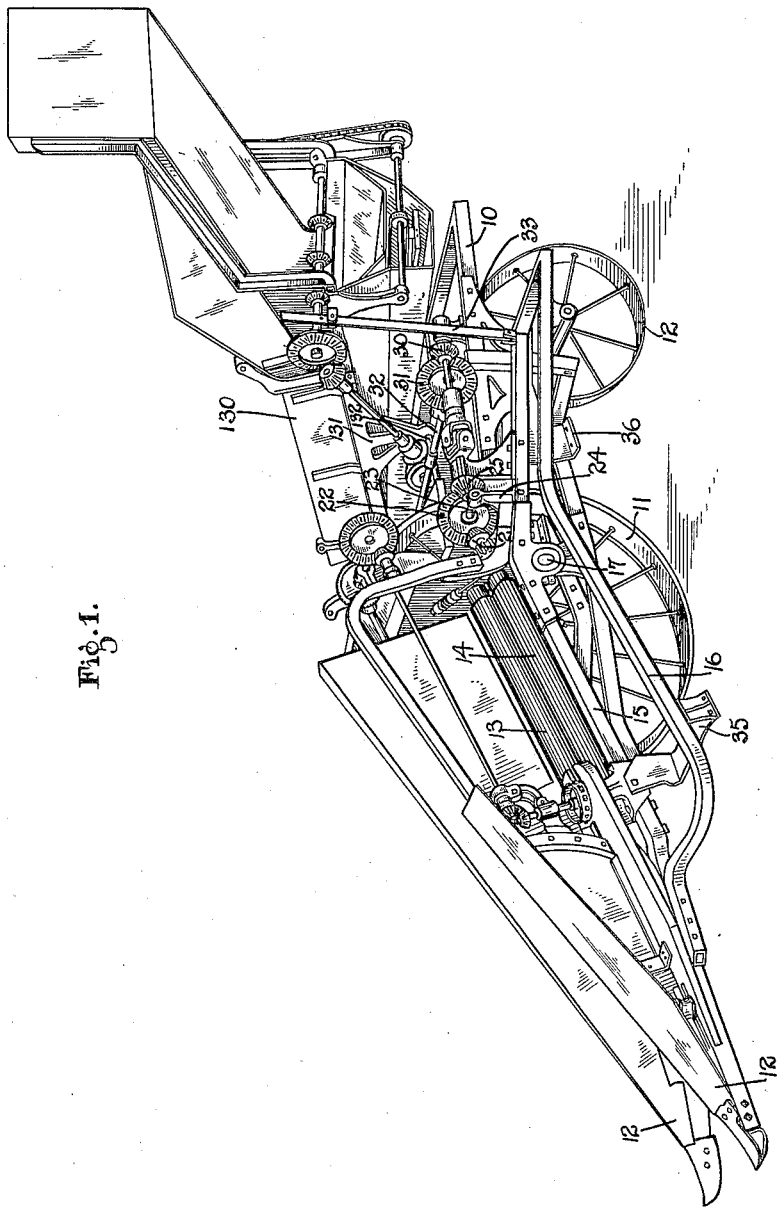

C. YOUNGER.
CORN GATHERING AND HUSKING MACHINE.
APPLICATION FILED JAN. 9, 1914.

1,101,607.

Patented June 30, 1914.
2 SHEETS—SHEET 1.

WITNESSES:

INVENTOR
Charles Younger
BY
ATTORNEY

C. YOUNGER.
CORN GATHERING AND HUSKING MACHINE.
APPLICATION FILED JAN. 9, 1914.
1,101,607.
Patented June 30, 1914.
2 SHEETS—SHEET 2.
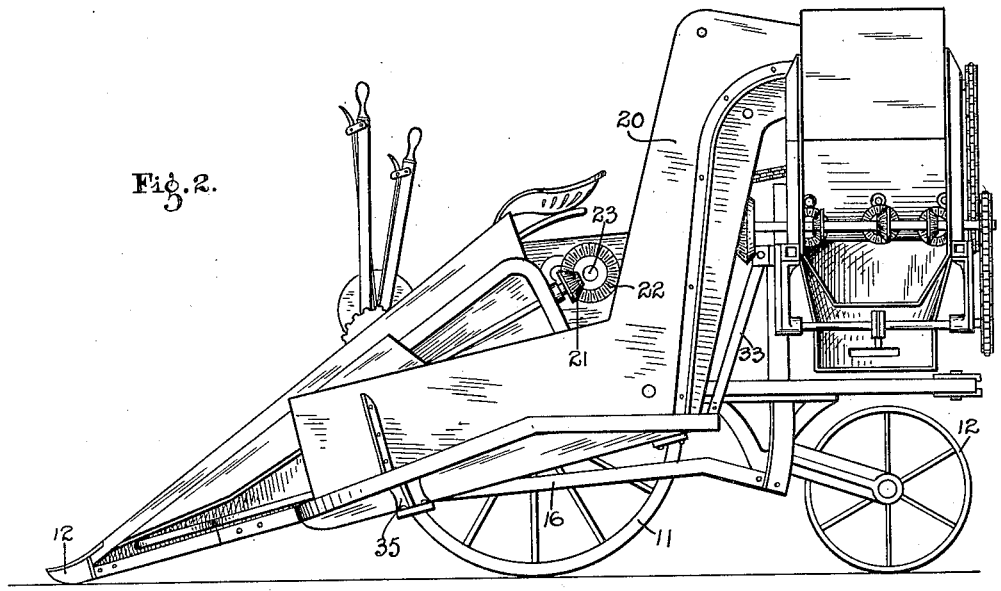
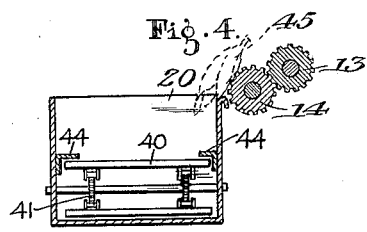
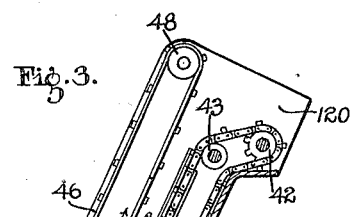
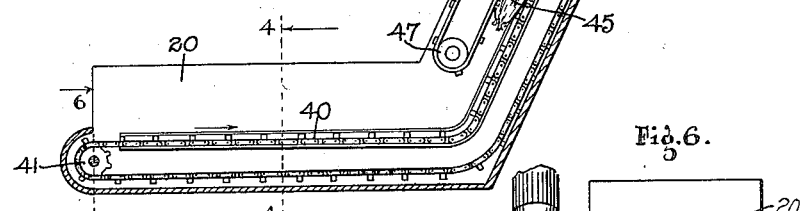
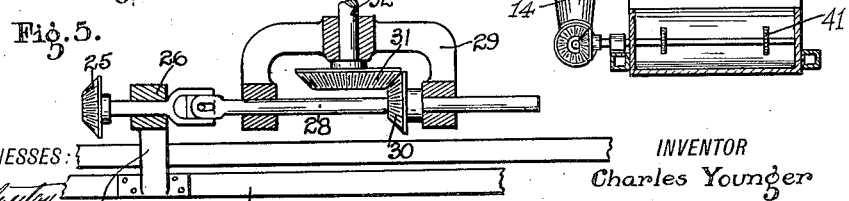
INVENTOR
Charles Younger
BY
ATTORNEY

UNITED STATES PATENT OFFICE.

CHARLES YOUNGER, OF RUSHVILLE, INDIANA, ASSIGNOR OF ONE-HALF TO ALPHEUS P. WALKER, OF RUSHVILLE, INDIANA, AND ONE-HALF TO CHARLES B. SMITH, OF ST. LOUIS, MISSOURI, AND MARSHALL E. NEWHOUSE, OF RUSHVILLE, INDIANA.

CORN GATHERING AND HUSKING MACHINE.

1,101,607.             Specification of Letters Patent.      Patented June 30, 1914.

Application filed January 9, 1914. Serial No. 811,183.

*To all whom it may concern:*

Be it known that I, CHARLES YOUNGER, a citizen of the United States, and a resident of Rushville, county of Rush, and State of Indiana, have invented a certain new and useful Corn Gathering and Husking Machine; and I do hereby declare that the following is a full, clear, and exact description thereof, reference being had to the accompanying drawings, in which like letters refer to like parts.

The object of this invention is to improve the construction of combined corn gathering and husking machine such as shown in my former applications for United States Letters Patent No. 675,624, filed February 5, 1912, and Serial No. 710,870, filed July 22, 1912.

The frame on which the gathering and snapping means are mounted is fulcrumed between its ends to the main frame so that the forward end of the gathering means may be vertically adjusted to suit the condition of the stalks of corn upon which the machine is operated and also a husking means is fulcrumed between its ends transversely of the machine and said frame carrying the gathering means and snapping rolls. My present invention combines with said parts a connection and a conveyer for conveying the corn from the gathering means and snapping rolls to the husking machanism, so that any adjustment of the gathering means will cause a corresponding adjustment of the husking means to enable the conveyer to satisfactorily operate between said parts.

Another feature of the invention consists in the particular construction of conveyer having a trough containing a main endless belt conveyer and a coöperating belt conveyer in the portion of said trough which extends upward and through which the corn must be elevated as it passes from the snapping rolls to the husker.

The full nature of the invention will be understood from the accompanying drawings and the following description and claims.

In the drawings, Figure 1 is a perspective view of the machine with the conveyer and other parts omitted for the sake of clearness. Fig. 2 is a side elevation of the machine in complete form. Fig. 3 is a vertical longitudinal section through the conveyer. Fig. 4 is a section across the conveyer on the line 4—4 of Fig. 3. Fig. 5 is a section through a part of the driving mechanism, parts being broken away. Fig. 6 is a section on the line 6—6 of Fig. 3.

There is shown herein a main frame carried upon suitable wheels 11 and 12, the particular means for transporting said frame being immaterial to this invention. There is a gathering means consisting of a pair of forwardly extending gathering guides 12 parallel with each other and snap rolls 13 and 14, which are mounted, as will hereafter be explained, upon a frame consisting of the bars 15 and 16, which clearly appears in Fig. 1. This frame is fulcrumed between its ends on a fulcrum 17 which extends from the main frame and is substantially in alinement with the axis of the main ground wheel 11, so that said frame, consisting of the parts 15 and 16 and which will hereafter be termed a " gathering frame " for the sake of brevity, can be vertically oscillated so as to lower or elevate the forward ends of the gathering guides 12 to suit the varying conditions of the corn stalks in the field at the time the machine is being used. If some of the stalks are down or close to the ground, it is desirable to lower the gathering guides and when such is not the condition it is more desirable to have the advancing points of said guides higher.

The form and construction of the gathering guides 12 need not be here explained because they constitute no novel part of this invention and their nature is familiar in the art and may be the same as shown in my former applications. They guide the corn stalks into a point between the rear ends of said guides and then as the machine progresses the stalks are drawn so the snapping rolls 13 and 14 will snap off the ears of corn and they fall over into the conveyer 20, as indicated in Fig. 4. The snapping roll 14 is located adjacent the upper inside edge of the conveyer 20 and the other snapping roll is on a higher plane so that the corn will fall by gravity from the snap rolls into the conveyer.

The snap rolls are driven by a beveled pinion 21 which meshes with a beveled gear 22 on a shaft 23 which is mounted in bearings, one of which, 24, is shown mounted in connection with the main frame. The beveled gear 22 is driven by a beveled pinion 25, see Fig. 5, on a shaft 6 mounted in bearings 27 secured to and extending up from bar 15 of the gathering frame and connected by a universal joint to a shaft 28 mounted in a yoke 29 and having a beveled pinion 30 meshing with a beveled pinion 31 on a driven shaft 32. The universal joint is made so as to allow ample longitudinal play to permit the beveled pinion 25 to remain in mesh with its gear 22 when the rear part of the gathering frame is tilted up or down.

The husking mechanism is mounted in frame 130 which is supported between its ends by a bracket 131 fulcrumed on a rod 132 so that the husking frame extends transversely of the machine and is oscillatable on said fulcrum. The details of the husking machine need not here be considered as that is immaterial, but the husking frame is pivotally connected with the rear end of the gathering frame by a connecting bar 33. Therefore, when the forward end of the gathering frame is tilted downward, its rear end and also the husking frame are correspondingly tilted upward and vice versa.

The conveyer 20 has a forward horizontal portion and a rearward upwardly extending portion which is nearly vertical, as appears in Fig. 3. It is supported on a cross bar 35 and a bracket 36 connected with the gathering frame, as seen in Fig. 1, so as to tilt with said frame. The upper rear end 120 of the conveyer frame extends rearwardly over the top of the husking frame so as to discharge into the same regardless of the tilting portion of the gathering frame and husking frame. Hence, the conveyer will always be in operative position with reference to the husking frame.

The conveyer as a whole consists of the trough portion 20 which is stationary excepting as it is moved by the tilting of the gathering frame and in it there is an endless conveyer 40 having transverse slats and running over a roller 41 at the forward end and a roller 42 at the upper rear end, and the upper side near the upper rear end rides over a roller 43 and throughout the remainder of its length the upper part operates under longitudinal flanges 44 which prevent the upper side of the conveyer from moving upward, as seen in Fig. 4. To help convey the ears of corn 45 through the upwardly extending part of the conveyer, there is an endless slatted belt 46 on rollers 47 and 48 which extends parallel with the conveyer and the two adjacent sides of the belt 46 and conveyer 40 coöperate in holding the ears of corn between them to prevent the ears of corn from dropping down.

The invention claimed is:

1. In a corn gathering and husking machine, a main frame, gathering means extending longitudinally of the main frame and fulcrumed thereon so that the front end thereof can be elevated and lowered, husking means extending transversely of the main frame and fulcrumed thereon, a connection between the gathering means and one end of the husking means for causing simultaneous and corresponding tilting movement of said two means, and conveyer means mounted in connection with the gathering means for conveying the corn therefrom and discharging it into the husking means.

2. A corn gathering and husking machine including a main frame, a gathering frame extending longitudinally thereof and fulcrumed between its ends thereto, gathering means mounted on the forward portion of said gathering frame, a husking frame fulcrumed to the main frame, a connection between the rear end of the gathering frame and one end of said husking frame for causing simultaneous movement of the two frames, and means mounted on the gathering frame for receiving the corn from the gathering means and conveying it and discharging it into the end of the husking frame which is connected with the gathering frame.

3. A corn gathering and husking machine including a main frame, a gathering frame extending longitudinally thereof and fulcrumed thereto between its ends, means mounted on the forward end of said gathering frame for receiving and guiding the corn stalks to the machine, snap rolls mounted on said gathering frame for receiving said corn stalks and separating the ears of corn therefrom, a husking frame fulcrumed to the main frame, a connection between the rear end of the gathering frame and the husking means, and a conveyer mounted on the gathering frame with its lower forward end in position to receive the ears of corn from the snap rolls and to elevate and discharge the same into the husking frame.

4. A corn gathering and husking machine including a main frame, a gathering frame extending longitudinally thereof and fulcrumed thereto between its ends, means mounted on the forward end of said gathering frame for receiving and guiding the corn stalks to the machine, snap rolls mounted on said gathering frame for receiving said corn stalks and separating the ears of corn therefrom, a husking frame fulcrumed to the main frame, a connection between the rear end of the gathering frame and the husking means, a conveyer mounted on the gathering frame with its lower forward end in position to receive the ears of corn from the snap rolls and to elevate and discharge the same into the husking frame, means mounted on the gathering frame for operating the snap rolls, and means mounted on the main frame flexibly connected with said snap roll operating means for driving the same during the various positions of the gathering frame.

5. A corn gathering and husking machine including a main frame, a gathering frame extending longitudinally thereof and fulcrumed thereto between its ends, means mounted on the forward end of said gathering frame for receiving and guiding the corn stalks to the machine, snap rolls mounted on said gathering frame for receiving said corn stalks and separating the ears of corn therefrom, a husking frame fulcrumed to the main frame, a connection between the rear end of the gathering frame and the husking means, a conveyer mounted on the gathering frame with its lower forward end in position to receive the ears of corn from the snap rolls and to elevate and discharge the same into the husking frame, a shaft mounted in connection with said gathering frame behind its fulcrum, means driven by said shaft for operating the snap rolls, and a driving shaft mounted on said main frame and connected with said first-mentioned shaft by a universal joint for driving the same.

6. A corn gathering and husking machine including a main frame, a gathering frame extending longitudinally thereof and fulcrumed thereto between its ends, means mounted on the forward end of said gathering frame for receiving and guiding the corn stalks to the machine, snap rolls mounted on said gathering frame for receiving said corn stalks and separating the ears of corn therefrom, a husking frame fulcrumed to the main frame, a connection between the rear end of the gathering frame and the husking means, a conveyer mounted on the gathering frame with its lower forward end in position to receive the ears of corn from the snap rolls and to elevate and discharge the same into the husking frame, a shaft mounted in connection with said gathering frame behind its fulcrum, means driven by said shaft for operating the snap rolls, a driving shaft mounted in the main frame, beveled gear on the end thereof, a yoke loosely mounted on said shaft with the arms extending on each side of said gear, another shaft mounted in said yoke and connected by a universal joint with the first-mentioned shaft, and a beveled pinion on said yoke mounted shaft meshing with the beveled gear on the driving shaft.

In witness whereof, I have hereunto affixed my signature in the presence of the witnesses herein named.

CHARLES YOUNGER.

Witnesses:
MARSHALL E. NEWHERN,
GEO. W. YOUNG.

---

Copies of this patent may be obtained for five cents each, by addressing the "Commissioner of Patents, Washington, D. C."